United States Patent Office 3,487,031
Patented Dec. 30, 1969

3,487,031
BINDER COMPOSITIONS FOR GRANULAR
SUBSTANCE-CONTAINING PAINTS
Soichi Muroi, Saitama-ken, and Shinzo Takai, Tokyo, Japan, assignors to Asahi Kasei Kogyo Kabushiki Kaisha, Osaka, Japan, a corporation of Japan
Filed Nov. 18, 1965, Ser. No. 508,467
Claims priority, application Japan, Nov. 24, 1964, 39/65,868
Int. Cl. C09d 5/28
U.S. Cl. 260—8       7 Claims

ABSTRACT OF THE DISCLOSURE

A binder composition for granular substance-containing paints which consists essentially of a resin having a glass transition temperature of 20° to 50° C. and a solvent having a boiling point of 120° to 200° C., the amount of the solvent being 20 to 150 parts by weight per 100 parts by weight of the resin. Said composition may contain a small amount of a water-soluble high polymer selected from the group consisting of methyl cellulose, carboxymethyl cellulose, polyvinyl alcohol, casein, polyacrylamide, polysodium acrylate and hydroxyethyl cellulose. A granular-substance-containing paint composition may be formed by mixing 100 parts by weight of macadams and 5 to 25 parts by weight of said binder composition and may be applied to an objective material at a temperature higher than −2° C.

---

Figure 1:
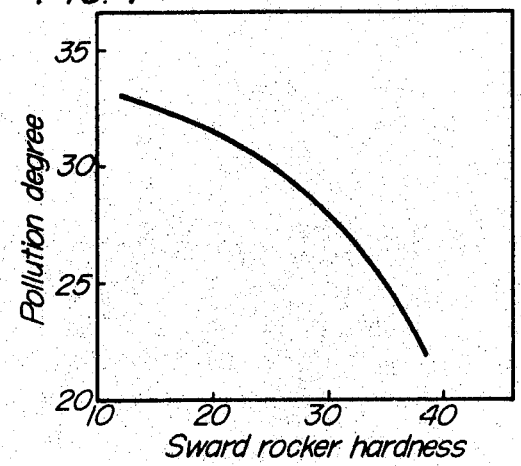

This invention relates to binder compositions for paints containing granular substances. More particularly, the invention relates to binder compositions for those paints containing granular substances which produce finished surfaces rich in color variety and in three-dimensional feeling when applied with a spray gun or a trowel.

As painting compositions, there have been hitherto known the so-called paints composed of various pigments and binders and so-called color cements composed of cement and coloring pigments. Recently there have been developed as indoor painting materials, new painting materials such as multi-color paints composed of oil paints and water paints and multi-color paints composed of water paint and piles of colored fibers, colored wood flour or perlite. At the same time, there have been used as outdoor materials, some quantity of painting materials composed of a large amount of fine macadam powder or fine macadam and an aqueous dispersion. However, all of these outdoor materials are based upon the same idea as the above-mentioned indoor painting materials. Since they have properties similar to those of water paints, they have not yet succeeded in providing finished surfaces rich in color variety and in three dimensional feeling while retaining the beauty of natural stone or while by mixing various kinds of differently colored macadam. Further, since not much consideration regarding their coating properties has been taken, their weather resistance has left something to be desired. Particularly since objects painted by these paint compositions are mostly used outdoors, weather-resistance of the coated surface is important. If considerations as to reduction of adhesion strength of macadam due to moisture, whitening of wetted surface on account of rain, ageing due to ultraviolet-rays, resistance to extreme temperature variation of coated surface from winter to summer or vice versa and stains caused by dust are not taken sufficiently, coated surfaces will lose their practical value.

The present inventors have concentrated their effort on studies of compositions of aqueous dispersion capable of affording a high grade of hardness when dried and satisfactory with respect to the above-mentioned objects. As is well-known, aqueous dispersions must be dried at a temperature considerably higher than the glass transition point of the dispersed resin in order to obtain a continuous, sufficiently adhered film from the aqueous dispersion. However when dispersions are used in such fields of application as hereinafter described, they are dried only at room temperature or a little above that. Hence it can be seen that dispersions capable of forming hard, continuous films such as those desired cannot be obtained unless a special technique is used. One such technique is a method which resorts to the formation of a network structure after shaping into a continuous film and the other is a method which resorts to the addition of a solvent which reduces only the glass transition temperature of the dispersed resin during the time of film forming and quickly evaporates after film forming. As for the former, there has not been known any sufficiently established method until now. As for the latter also, it has been used only for the purpose of a slight reduction of the glass transition temperature. There has not been known any method used for such a drastic reduction of glass transition temperature as desired in the present method. Since the latter method is simple, applicants have made comprehensive studies from various aspects of this method.

In the first place it is necessary to decide the composition of the objective synthetic resin. By studying the glass transition temperature (Tg) necessary to provide the above-mentioned properties it was discovered that the higher the temperature is, the better the result is. In other words by a comprehensive study of the water absorption of film produced from the present dispersion, it was found that water absorption is caused by the difference in osmotic pressures between the inside and the outside of the film. The resistance to osmotic penetration of water into the film is believed to be afforded by the elastic modulus of the film. Thus, the tendency toward water penetration is reduced with an increase in the hardness of the film. When the elastic modulus of the film reaches a value lower than that at its glass transition temperature, there occurs no water absorption.

On the other hand, when a solvent is to be added in order to make it possible to form film at room temperature (higher than 0—−2° C.) there must naturally be a limitation in the amount of solvent to be added in view of the characteristic properties of aqueous dispersions and economical problem. On considering these factors, the glass transition temperature (Tg) to be employed, lies in the range of 20° to 50° C. preferably from 30° to 50° C. Of course it is impossible to effect film formation at room temperature with the use of an aqueous dispersion the Tg of which lies in this range as such.

Synthetic resins which meet the above-mentioned requirement have been obtained by copolymerizing a suitable mixture of one member selected from the group consisting of monomers capable of affording a relatively hard polymer i.e. styrene, α-methyl styrene, vinyl toluene, and methacrylic ester possessing an alcohol radical having less than 3 carbon atoms (hereinafter these monomers will be referred to as the A group monomer) and a member selected from the group consisting of acrylic esters possessing an alcohol radical having at least 2 carbon atoms and methacrylic esters possessing an alcohol radical having at least 4 carbon atoms (hereinafter these monomers will be referred to as the B group monomer) so as to afford a copolymer possessing the above-defined Tg. Of course the composition of the copolymer is not limited to the above-mentioned members. When they are applied to a place of relatively mild conditions, a resin which is less weather-resistant such as vinyl acetate, butadiene, vinyl chloride or the like can also be used. Further the Tg specified above can also be applied to a resin containing a plasticizer which is slow in vaporization velocity.

Further studies have been made on various kinds of solvents. There is a limitation in the range of the boiling point of the solvent used to fulfil the object of the invention. When the boiling point of the solvent is too high, there is a danger that large amounts of stain may be deposited before sufficiently high hardness is attained because too much vaporization after film forming requires too much time. If such is the case, there is no difference from the commonly used dispersions on the market. On the other hand, when the boiling point is too low, the solvent evaporates together with water without fulfilling its function. As a result of these studies it has been found that the suitable range is 120° to 200° C., preferably from 140° to 180° C. Solvents having such a boiling point range include nonyl acetate, methyl acetoacetic acid, ethyl acetoacetic acid, methyl Cellosolve acetate, Cellosolve acetate, methyl Carbitol acetate, butyl Carbitol acetate, Cellosolve, butyl Cellosolve, trichlene, xylene, chlorobenzene, dichlorobenzene, butylbenzene and the like.

As mentioned above, quite a wide variety of solvents can be used but the choice must be made according to the kind of resin and the economical standpoint. They cannot be put in the same category. The amount of addition must be determined by the properties (i.e. Tg and composition of copolymer) of the dispersed resin but it is in the range of 20 to 150 parts preferably from 30 to 100 parts by weight relative to the resin.

Figure 2:
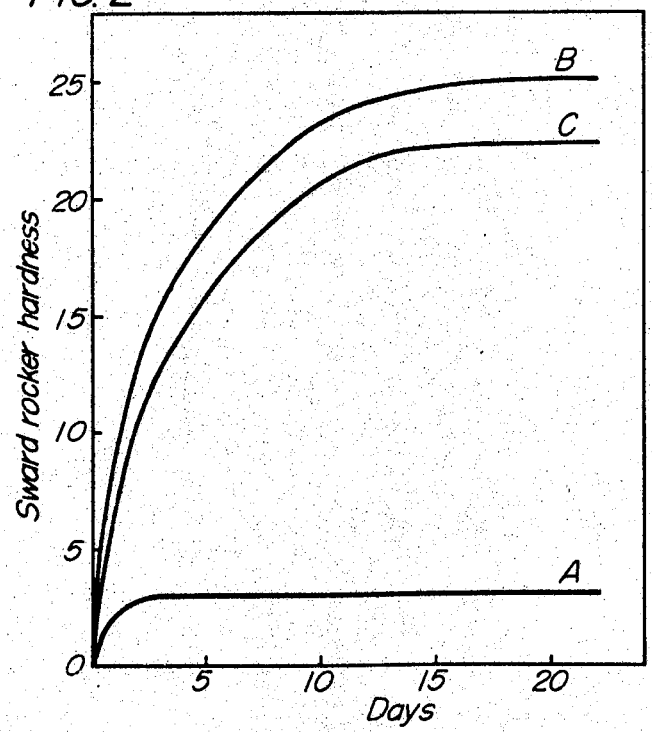

One embodiment of the compositions thus obtained is illustrated in FIGURE 2. The composition used here is obtained by adding from 80 to 30 parts by weight of xylene relative to 100 parts by weight of resin included in a copolymer emulsion, the copolymer being composed of styrene and 2-ethylhexyl acrylate in ratios of 70:30 (A in FIGURE 2) and 63:37 (B in FIGURE 2). A specimen used as a control is a common dispersion on the market. Said compositions can be coated to form films even at a temperature as low as about 0° to −2° C. After coating and forming films, their hardness increases gradually. The films thus obtained were hardly polluted and thus meet the object of the present invention fully. This is clearly proved in FIGURE 2 where the relationship between Sward-Rocker hardness and pollution degree of film obtained from dispersion is indicated. Films of different hardness were obtained from aqueous dispersion of a copolymer of styrene and 2-ethyl hexyl acrylate prepared by altering the ratio of composition. The hardnesses were measured after pouring said aqueous dispersion upon glass plates, subsequently drying at temperatures ranging from 120° to 150° C. and leaving same to stand overnight at a temperature of 20° C. As for pollution degree, said aqueous dispersions were painted on white paper boards and after being dried at a temperature of 120° to 150° C., they were left to stand overnight at a temperature of 20° C. Thereafter with the use of a revolving type pollution tester for fabrics, they were polluted by adhering carbon black thereto. The pollution degree was calculated from the following equation after measuring reflectivity of ray of said specimen.

Polution degree =

$$\frac{\text{(reflectivity of original specimen)} - \text{(reflectivity of specimen after treatment)}}{\text{reflectivity of original specimen}} \times 100$$

The results of coating experiments with the use of one of said compositions B is as follow: to 25 parts by weight of said composition (containing 30 percent by weight of resin) 100 parts by weight of ground marble which has passed a screen of 1.5 x 1.5 mm. were added and suitably caused to froth. Then the composition containing ground marble was sprayed with the use of a 6 mm. diameter mortar gun. Coated surfaces just after spraying showed milky-turbidity but with drying, the colors of marble gradually appeared. The colors at that instant are different from those originally but wetness added to their brightness.

The time necessary for drying varies depending upon temperature, humidity, wind velocity, location, composition and the like. In general, less than one hour and less than 5 hours are required for said drying when the drying is effected under direct sunlight and in the shade, respectively. Of course, immediately after the drying, the adhesion strength is still low, but with the volatilization of the solvent (high boiling point) caused subsequent to the volatilization of water, the adhesion strength is increased, and about one to two months after the coating, the maximum strength is reached. The present method can be applied to various kinds of copolymers. Further, the addition of a small amount of a water-soluble resin such as methyl cellulose, carboxymethyl cellulose, polyvinyl alcohol, casein, polyacrylamide, polysodium-acrylate or hydroxyethyl cellulose is effective in improving the processability of the paint.

The characteristic point of the present composition is to provide exceedingly hard film when dried in comparison with emulsions on the market. This is indicated in FIGURE 2. Thus the coated film obtained from the paint composition consisting of the present composition and granulated substance is much superior to common water dispersions in the following three points:

(1) There is no reduction of adhesive power and mechanical properties due to water absorption because the amount of water absorption is low when exposed to rainfall.

(2) Since the glass transition temperature is high, the adhesion strength is high at high temperatures.

(3) Since the hardness of film is high the pollution degree is low, as is evident from FIGURE 1.

The following examples will further illustrate this invention. In the examples, all parts are by weight unless otherwise indicated.

EXAMPLE 1

To 30 parts of the composition of water emulsion prepared by adding 30 parts of xylene and 10 parts of a 15 percent aqueous solution of polyvinyl alcohol to 100 parts of a 50 percent water dispersion of a copolymer composed of 60 percent α-methyl styrene and 40 percent 2-ethyl hexyl acrylate were admixed 100 parts of serpentine which passed a 5 mesh screen and the mixture which was caused to foam well was sprayed with a 7 mm. diameter mortar gun under a pressure of 5 atms.

Under the direct rays of the sun, the dispersion formed into a film by which a dark green coating having a three-dimensional feeling was obtained. The adhesion strength of the serpentine increased with the lapse of time. After about one month, washing with a brush hardly caused the serpentine to fall off the coated surface. Even where exposed to rain, the coated surface increased wet color. Whitening of the film was not observed at all.

EXAMPLE 2

25 parts of the composition of water dispersion prepared by adding 30 parts of Cellosolve and 8 parts of a 10 percent aqueous solution of polysodium acrylate to 100 parts of 45 percent by weight aqueous dispersion of a copolymer composed of 60 percent by weight styrene and 40 percent by weight ethyl acrylate and 100 parts of yellow marble macadam which passed an 8 mesh screen were mixed well. The mixture was caused to froth and subjected to spraying with the use of an 8 mm. diameter mortar gun under a pressure of 4 atms. Since the light stability of yellow marble is inferior to that of serpentine, decoloration was observed on the coating of the above-mentioned composition. The adhesion strength was nearly the same as in the case of Example 1.

EXAMPLE 3

30 parts of an aqueous dispersion prepared by adding 40 parts of xylene and 5 parts of 15 percent polyvinyl alcohol to 100 parts of a 40 percent aqueous dispersion of a copolymer composed of 60 percent by weight methyl methacrylate and 40 percent by weight butyl acrylate and 100 parts of black marble macadam which passed a 3 mesh screen were mixed well and caused to froth. The mixture was sprayed with a 7 mm. diameter mortar gun under a pressure of 6 atms. The drying and adhesion properties were nearly the same as in the case of Example 1.

EXAMPLE 4

20 parts of an aqueous dispersion prepared by adding 60 parts of chlorobenzene to 100 parts of a 50 percent by weight aqueous dispersion of a 50:50 copolymer of styrene and ethyl acrylate and 100 parts of fine gravel, product from Oiso in Japan, were mixed with the greatest possible care on frothing. Then, the objective materials were coated with the above-mentioned highly viscous dispersion to a thickness of about 0.1 mm. with use of a trowel, a brush, a spatel or a roller in advance. Before being completely dried, a mixture of the dispersion and fine gravel was spread upon the above-mentioned coated objective materials. A little longer time than in Example 1 was required but a coat possessing a new feeling was obtained.

EXAMPLE 5

25 parts of an aqueous dispersion prepared by adding 80 parts of butylcellosolve and 10 parts of a 3 percent by weight aqueous solution of methyl cellulose to 100 parts of a 40 percent by weight aqueous dipsersion of a 70:30 copolymer of methyl methacrylate and 2-ethyl hexyl acrylate and 100 parts of yellow marble macadam which passed 8 mesh but not 3 mesh screens were mixed and the mixture was applied to the objective substances by the same method as in Example 4. The drying required a little longer time but provided an extremely preferable yellow coated surface.

What we claim is:

1. A binder composition for paints containing granular substances, said binder composition consisting essentially of (1) a copolymer obtained by copolymerizing a first monomeric compound selected from the group consisting of styrene, α-methylstyrene, vinyl toluene and methacrylates of alcohols having less than 3 carbon atoms and a second monomeric compound selected from the group consisting of acrylates of alcohols having at least 2 carbon atoms and methacrylates of alcohols having at least 4 carbon atoms, the glass transition temperature of said copolymer being in the range of 20° C. to 50° C., and (2) an organic solvent having a boiling point in the range of 120° to 200° C., said solvent being present in an amount of 0.2 to 1.5 parts by weight per part by weight of the copolymer and said solvent being capable of reducing the glass transition temperature of said copolymer to 0° to −2° C.

2. A binder composition according to claim 1 including a plasticizer of extremely low volatility for reducing the glass transition temperature of the resin to the range of 20° to 50° C.

3. A binder composition according to claim 1 wherein the glass transition temperature is in the range of 30°–50° C. and the organic solvent has a boiling point in the range of 140°–180° C.

4. A binder composition according to claim 1 wherein the organic solvent is selected from the group consisting of nonyl acetate, methyl acetoacetic acid, ethyl acetoacetic acid, methyl Cellosolve acetate, Cellosolve acetate, methyl Carbitol acetate, butyl Carbitol acetate, Cellosolve, butyl Cellosolve, trichlene, xylene, chlorobenzene, dichlorobenzene and butylbenzene.

5. A paint consisting of a binder composition as claimed in claim 1 and ground marble, said binder composition being present in an amount of 0.05–0.25 part by weight per part by weight of ground marble.

6. A binder composition for paints containing granular substances, said binder composition consisting of an aqueous dispersion of a resin having a glass transition temperature in the range of 20° to 50° C., an organic solvent which reduces only the glass transition temperature of the resin and has a boiling point in the range of 120° to 200° C. and a small amount of a water-soluble high polymer selected from the group consisting of methyl cellulose, carboxymethyl cellulose, polyvinyl alcohol, casein, polyacrylamide, polysodiumacrylate and hydroxyethyl cellulose, the solvent being present in an amount of 0.2–1.5 parts by weight per part by weight of the resin.

7. A paint consisting of a binder composition as claimed in claim 6 and ground marble, said binder composition being present in an amount of 0.05–0.25 part by weight per part by weight of ground marble.

References Cited

UNITED STATES PATENTS

| | | | |
|---|---|---|---|
| 2,934,509 | 4/1960 | Crissey et al. | |
| 2,934,510 | 4/1960 | Crissey et al. | |
| 3,006,872 | 10/1961 | Benedict et al. | 260—901 |
| 3,092,601 | 6/1963 | Sullivan et al. | 260—17.4 |
| 3,098,053 | 7/1963 | Hallonquist | 106—195 |
| 3,242,144 | 3/1966 | McNally | 260—41 |
| 3,280,050 | 10/1966 | Johnson et al. | 260—17.4 |
| 3,287,290 | 11/1966 | Bray. | |
| 3,366,584 | 1/1968 | Zimmerman | 260—887 |
| 3,117,942 | 1/1964 | Kingston et al. | |

FOREIGN PATENTS

| | | |
|---|---|---|
| 232,096 | 1/1961 | Australia. |
| 224,866 | 2/1959 | Australia. |

WILLIAM H. SHORT, Primary Examiner

E. M. WOODBERRY, Assistant Examiner

U.S. Cl. X.R.

260—17, 29.6, 31.2, 31.6, 32.2, 33.6, 33.8, 41, 885, 886, 887, 901